United States Patent
Fuchs et al.

(10) Patent No.: US 12,356,896 B2
(45) Date of Patent: Jul. 15, 2025

(54) SYSTEM AND METHOD FOR CONTROLLING A WRAPPING PROCESS

(71) Applicant: Usines CLAAS France S.A.S, St. Rémy/Woippy (FR)

(72) Inventors: Volker Fuchs, Saarburg (DE); Vincent Vagnier, Fresnes en Woevre (FR); Steve Obellianne, Courcelles-Chaussy (FR); Laurent Rongvaux, Tronville (FR); Renaud Wucher, Metz (FR); Thibaut Dachelet, Woippy (FR)

(73) Assignee: Usines CLAAS France S.A.S, St. Rémy/Woippy (FR)

( * ) Notice: Subject to any disclaimer, the term of this patent is extended or adjusted under 35 U.S.C. 154(b) by 0 days.

(21) Appl. No.: 18/239,312

(22) Filed: Aug. 29, 2023

(65) Prior Publication Data
US 2024/0067377 A1    Feb. 29, 2024

(30) Foreign Application Priority Data
Aug. 29, 2022 (DE) .................... 10 2022 121 786.8

(51) Int. Cl.
A01F 15/07    (2006.01)

(52) U.S. Cl.
CPC .... A01F 15/0715 (2013.01); *A01F 2015/072* (2013.01); *A01F 2015/076* (2013.01)

(58) Field of Classification Search
CPC ................ A01F 15/071; A01F 15/0715; A01F 2015/072; A01F 2015/076
(Continued)

(56) References Cited

U.S. PATENT DOCUMENTS

| | | | |
|---|---|---|---|
| 6,536,337 B2 | 3/2003 | Huchet et al. | |
| 7,181,900 B2 * | 2/2007 | Hood et al. | A01F 15/0715 100/88 |

(Continued)

FOREIGN PATENT DOCUMENTS

| | | |
|---|---|---|
| DE | 10026066 A1 | 11/2001 |
| EP | 2816887 B1 | 2/2017 |
| EP | 3199015 B1 | 7/2019 |

OTHER PUBLICATIONS

European Search Report for EP Application No. 23179412.4-1105 mailed Feb. 15, 2024.

*Primary Examiner* — Stephen F. Gerrity
(74) *Attorney, Agent, or Firm* — Lempia Summerfield Katz LLC (57) ABSTRACT

A system and method for controlling a wrapping process of a round bale is disclosed. The round bale rotates in a bale chamber of a round baler with elastic wrapping material being removed from a supply roller using a tensioning device and guided during the wrapping process by at least one guide roller. The round bale is wrapped with the wrapping material pretensioned by the tensioning device with an adjustable wrapping tension predetermined by the control unit. A sensor assembly may sense the actual value for a force resulting from the wrapping tension, which is compared with a target value for the force resulting from the wrapping tension, which is determined during the performance of at least one preceding wrapping operation and specific to the wrapping material. The control unit controls the tensioning device depending on the deviation determined by the comparison of the actual value and the target value.

20 Claims, 5 Drawing Sheets

(58) Field of Classification Search
USPC .............................................................. 53/64
See application file for complete search history.

(56) References Cited

U.S. PATENT DOCUMENTS

| | | | |
|---|---|---|---|
| 10,827,685 B2 * | 11/2020 | Talsma et al. ...... | A01F 15/0715 |
| 2002/0046552 A1 | 4/2002 | Huchet et al. | |
| 2009/0282788 A1 * | 11/2009 | McClure ............ | A01F 15/0715 |
| | | | 53/587 |
| 2019/0045717 A1 * | 2/2019 | Talsma et al. ...... | A01F 15/0715 |
| 2019/0090430 A1 | 3/2019 | Arnould et al. | |
| 2023/0180667 A1 * | 6/2023 | Schlichting ......... | A01F 15/0715 |
| | | | 56/432 |

* cited by examiner

SYSTEM AND METHOD FOR CONTROLLING A WRAPPING PROCESS

CROSS REFERENCE TO RELATED APPLICATION

This application claims priority under 35 U.S.C. § 119 to German Patent Application No. DE 10 2022 121 786.8 filed Aug. 29, 2022, the entire disclosure of which is hereby incorporated by reference herein.

TECHNICAL FIELD

The present invention relates to a method for controlling a wrapping process of a round bale rotating in a baling chamber of a round baler, to a round baler, and to a system for controlling a wrapping process for a round bale rotating in a baling chamber of a round baler.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

DE 100 26 066 A1 discloses a round baler that includes a tensioning device designed as a brake. The brake acts using a motor on elastic, web-like wrapping material that is drawn off a supply roller, and thereby causes the wrapping material to be tightened. A control unit controls the motor, through which the tension on the wrapping material may vary.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

As discussed in the background, an elastic wrapping material may be used to bind the bales (which may comprise cut and raked crop). Various types of elastic wrapping material are contemplated, such as plastic film. When the elastic wrapping material is pulled off, the elastic wrapping material may undergo an elongation due to the tension applied by the tensioning device, which may be set by the control unit controlling actuation of the tensioning device. In one or some embodiments, the resulting tension of the wrapping material during wrapping may be set depending on the material-specific tension-elongation determination. The material-specific tension-elongation determination may be manifested in one of several ways, such as in the form of a material-specific tension-elongation diagram, a material-specific tension-elongation table, material-specific tension-elongation map, or the like. In this regard, any discussion herein regarding a material-specific tension-elongation diagram may be applied equally to any type of material-specific tension-elongation determination.

External ambient influences on the elongation behavior of the wrapping material, such as ambient temperature and/or humidity, may not be taken into account so that the actual tension arising in the wrapping material deviates from the specified, desired tension and the associated elongation behavior.

Thus, in one or some embodiments, a method for controlling a wrapping process, a round baler, and a system are disclosed, which may comprise improved control of the tension applied to the wrapping material by the tensioning device.

In one or some embodiments, a method for controlling a wrapping process of a round bale rotating in a bale chamber of a round baler with an elastic, web-like wrapping material is disclosed. The wrapping material may be drawn off or removed from at least one supply roller using a tensioning device (with one or more aspects of the tension device being controlled by a control unit) and may be guided during the wrapping process by at least one guide roller. The round bale may be wrapped with the wrapping material pretensioned by the tensioning device with an adjustable wrapping tension set by the control unit. In one or some embodiments, a sensor assembly (which may comprise at least one sensor) generates data (e.g., sensor data) that is indicative of an actual value for a force (e.g., the sensor data is a numerical value that is the actual value of the tensioning force) resulting from the wrapping tension. The control unit may be configured to automatically compare the actual value with a target value for the force resulting from the wrapping tension (the target value may be derived from a tension-elongation diagram (or other type of material-specific tension-elongation determination) determined during the performance of at least one preceding wrapping process and/or may be specific to the wrapping material). Thus, the target value may be stored in a memory accessible by the control unit. In turn, the control unit may automatically control the tensioning device dependent on the comparison (e.g., the control unit may control the tensioning device depending on a deviation determined by the comparison of the actual value and the target value). As one example, responsive to the automatic comparison indicating that the actual value of the tensioning force (as indicated by the sensor) is less than the target value for the tensioning force (e.g., the actual value is less than the target value by at least a predetermined amount), the control unit may automatically control the tensioning device in order to increase the wrapping tension. Conversely, responsive to the automatic comparison indicating that the actual value of the tensioning force (as indicated by the sensor) is greater than the target value for the tensioning force (e.g., the actual value is greater than the target value by at least a predetermined amount), the control unit may automatically control the tensioning device in order to decrease the wrapping tension.

Thus, in one or some embodiments, the tensioning device may be controlled depending on a set value (e.g., the target value) that is derived from the tension-elongation diagram (or other type of material-specific tension-elongation determination) for the wrapping material to be processed. In this way, the influence of the quality of the wrapping material on the elongation behavior may be taken into account. In particular, the quality may be influenced, for example, by the uniformity of the thickness of the wrapping material.

As discussed above, various types of wrapping material are contemplated. For example, polyethylene may be used as the wrapping material. Polyethylene, like other plastic materials, generally shows a very similar characteristic curve in the tension-elongation diagram (or other type of tension-elongation determination), wherein the relative position of the curve is unknown. In order to be able to exploit the possible material properties as fully as possible, in addition to the specified adjustable wrapping tension, the sensor assembly (which may comprise at least one sensor) may determine the actual value for the force resulting from the wrapping tension. In turn, the actual value may be used as an input variable in order for the control unit to control the elongation of the wrapping material by controlling (e.g., actuating) the tensioning device.

The method may therefore enable optimum use of the wrapping material. As a result, film binding may work more reliably, and wrapping material consumption may be reduced. The method may further enable better and faster control of the stretching of the wrapping material.

In one or some embodiments, the tension-elongation diagram (or other type of tension-elongation determination) specific to the wrapping material may be adjusted depending on changing ambient conditions during the execution of a work order, which may comprise a plurality of winding operations. This may enable better utilization of the wrapping material compared to conventional systems. In particular, conventional systems according to the prior the art are operated with a safety margin due to a lack of knowledge of the material properties in order to avoid breakage or tearing of the wrapping material from excessive wrapping tension. In one or some embodiments, the method enables control of the wrapping tension, with the control taking into account the influence on the tension-elongation diagram specific for the wrapping material depending on changing ambient conditions. Different positions of the particular characteristic in the tension-elongation diagram may be influenced, for example, by temperature changes.

In particular, the target value may be adjusted depending on the adaptation of the tension-elongation diagram (or other type of tension-elongation determination) to changing ambient conditions. The influence of changes in the external ambient conditions may be taken into account promptly (e.g., in real-time or in near real-time) in order to adapt the target value for the force resulting from the winding stress to new conditions. For example, the target value may be adjusted when working within a same area (e.g., within a same field) or within a same time frame (e.g., within a same day, within a same hour, etc.).

In one or some embodiments, an initial wrapping process may be performed during which a successive increase in the wrapping tension applied by the tensioning device is performed, wherein the control unit determines the actual force curve resulting from the change in the wrapping tension of the wrapping material, with the actual force curved being stored or recorded (such this process may be performed periodically or cyclically). In turn, the control unit may use the actual force curve to determine initial tension-elongation behavior valid for currently prevailing ambient conditions. For this purpose, a first round bale to be produced at the beginning of the work process may be wrapped with wrapping material. During the wrapping process of this first round bale, the successive increase in the wrapping tension applied by the tensioning device may cause the tension in the wrapping material to increase. The cyclic determination and recording of the actual force curve resulting from the change in the wrapping tension of the wrapping material may be used by the control unit to determine the initial tension-elongation behavior. The term "cyclic" in this context may mean a continuous execution of determining and recording, in particular at discrete time intervals, or discontinuous (e.g., at irregular time intervals). Based on this initial diagram for the tension-elongation behavior, the control unit may control the tensioning device during a subsequent wrapping process for another round bale in such a way that tension of the wrapping material is established, which may correspond to a defined point in the tension-elongation diagram (e.g., optimized for material utilization). The phrase "initial wrapping process" may be understood in a broad sense and may also comprise the determination of the initial tension-elongation behavior including at a later point in time during the work process when a renewed adjustment of the tension-elongation diagram is warranted due to changing ambient conditions.

In one or some embodiments, the at least one sensor of the sensor assembly may comprise a force sensor, which may be assigned to the area of the at least one guide roller with which the actual value for the force resulting from the wrapping tension is measured. The at least one force sensor may be arranged or positioned in the area of one or more guide rollers for guiding the wrapping material to detect the force resulting from the tension of the wrapping material and acting on the one or more guide rollers. It is also contemplated that a plurality of force sensors may be used, each of which may be assigned to a respective guide roller of a respective group comprising (or consisting of) a plurality of guide rollers.

Additionally or alternatively, the at least one sensor of the sensor assembly may be designed as a force sensor which is configured to generate data indicative of the drive force (alternatively driving force) to be provided by a drive device (e.g., so that the control unit may interpret or analyze the sensor data in order to determine the drive force) and with which the tensioning device is operated. Alternatively, or in addition, the at least one sensor of the sensor assembly may be designed as a pressure sensor configured to generate data indicative of hydraulic pressure (e.g., the control unit may interpret or analyze the sensor data in order to determine the hydraulic pressure), which may act on the hydraulically operated tensioning device. In one or some embodiments, the drive force and/or the hydraulic pressure may be proportional to the wrapping tension applied to the wrapping material by the tensioning device.

In particular, depending on a change in an ambient parameter, such as one or both of humidity or ambient temperature, which may be detected by at least one ambient sensor and whose data may be transmitted to the control unit for evaluation. In response, the control unit may compare the current ambient parameter (e.g., humidity or ambient temperature) with a previously stored ambient parameter. Responsive to a deviation (e.g., a deviation greater than a predetermined amount), the control unit may adjust the tension-elongation diagram (or other type of tension-elongation determination) and/or to update the target value. In this regard, a check of the need to adjust the tension-elongation diagram (or other type of tension-elongation determination) and/or to update the target value may be performed based on a change in one or more ambient parameters. This may be based on the consideration that during round baler operation, which may often extend over several hours, changes in ambient conditions may be responded to in order to ensure efficient operation. In one or some embodiments, a number of threshold values may be set for relative humidity as well as ambient temperature. Passing at least one of the threshold values (e.g., as determined by the control unit) may initiate the control unit to automatically execute the checking of the need to adjust the tension-elongation diagram (or other type of tension-elongation determination) and/or update the target value. However, it is also contemplated that when at least one of the threshold values is passed, only a message is output to an operator of the round baler that it would be warranted to check the need to adjust the tension-elongation diagram (or other type of tension-elongation determination) and/or update the target value.

In one or some embodiments, a round baler is disclosed that comprises: a bale chamber in which a rotating bale is wrapped with an elastic, web-like wrapping material; a control unit configured to control a tensioning device in order to draw off wrapping material from at least one supply roller; and at least one guide roller for guiding the drawn-off wrapping material during the wrapping process. The control unit may be configured to automatically specify an adjustable wrapping tension to the tensioning device in order to wrap the round bale with the wrapping material pretensioned by the tensioning device. Further, the round baler may comprise a sensor assembly comprising at least one sensor, which may be configured to determine an actual value for a force resulting from the wrapping tension (e.g., the at least one sensor generates data indicative of the actual force, which may be automatically analyzed by the control unit to determine the actual value of the force). In turn, the control unit may be configured to automatically compare the actual value of the force with a target value for the force resulting from the wrapping tension which the control unit derives from a tension-elongation diagram (or other type of tension-elongation determination) determined during the performance of at least one preceding wrapping process and specific to the wrapping material. Responsive to the comparison, the control unit may automatically control the tensioning device (e.g., the control unit automatically controls the tensioning device depending on a deviation determined by the comparison of the actual value and the target value).

By measuring the force acting on the wrapping material which may be proportional to the tension in the wrapping material, a faster and more accurate control of the elongation behavior as well as the control of the tensioning device may be realized. In connection with this, the risk of tearing the wrapping material and therefore downtimes of the round baler may be reduced.

In one or some embodiments, the at least one sensor of the sensor assembly may be designed as a force sensor, which may be arranged or positioned in the area of the at least one guide roller in order to determine (e.g., generate data indicative of) the actual value for the force resulting from the wrapping tension.

In particular, the tensioning device may be designed as a braking device with a hydraulically or electromechanically operated drive device.

In this context, the at least one sensor of the sensor assembly may be designed as a force sensor, which may be configured to determine (e.g., generate data indicative of) the driving force provided by the drive device in order to determine the actual value for the force resulting from the wrapping tension. Alternatively, the at least one sensor of the sensor assembly may be designed as a pressure sensor, which may be configured to determine (e.g., generate data indicative of) a hydraulic pressure applied to the hydraulically operated drive device in order to determine the actual value for the force resulting from the wrapping tension.

In one or some embodiments, a deflection roller assembly may be arranged or positioned downstream from the tensioning device and may comprise a plurality of deflection rollers, which are rotatably mounted on a holding device. The holding device may be loaded by a spring force as a counterforce when the wrapping material is pulled off. A sensor, which may be designed as a potentiometer, may detect the deflection of the spring-loaded holding device based on the force resulting from the wrapping tension.

In one or some embodiments, the round baler is designed with at least one ambient sensor that is configured to detect changes in at least one ambient parameter, such as the humidity and/or ambient temperature. Therefore, the ambient environment may be considered so that, during the operation of the round baler, changes in the ambient conditions, which may influence the wrapping process, may be considered. At least one ambient sensor may be arranged or positioned inside the round baler since the ambient parameters (e.g., the temperature) inside the round baler may generally differ from those outside the round baler during ongoing operation.

In particular, the control unit may be configured to evaluate the signals of the at least one ambient sensor and, depending on the evaluation, to suggest to an operator of the baler and/or automatically perform an adaptation of the tension-elongation diagram (or other type of tension-elongation determination) and/or the automatic updating of the target value. For this purpose, the control unit may cause a message to be output on a user interface (e.g., a touchscreen) in order to notify an operator of the need to perform an adaptation of the tension-elongation diagram (or other type of tension-elongation determination) and/or the update of the target value. Alternatively, the control unit may automatically perform the adjustment of the tension-elongation diagram (or other type of tension-elongation determination) and/or the updating of the target value. In this case, the operator may be notified by an output via the user interface that a corresponding adjustment and/or update is being automatically performed.

In one or some embodiments, a system for controlling a wrapping process of a round bale is disclosed. The round bale may rotate in a bale chamber of a round baler with an elastic, web-like wrapping material, which may be drawn off or removed from at least one supply roller and guided during the wrapping process in order to wrap the round bale with the pretensioned wrapping material. The system may comprise: a tensioning device for drawing off or removing wrapping material from the at least one supply roller; at least one guide roller for guiding the drawn-off or removed wrapping material during the wrapping process; and a control unit configured to control the tensioning device with an adjustable wrapping tension in order to wrap the round bale with the wrapping material pretensioned by the tensioning device. In one or some embodiments, the system comprises a sensor assembly comprising at least one sensor which is configured to determine an actual value for a force (e.g., generate data indicative of the actual value of the force) resulting from the wrapping tension and to transmit it to the control unit. In turn, the control unit may be configured to automatically compare the actual value with a target value for the force resulting from the wrapping tension, which may be derived by the control unit from a tension-elongation diagram (or other type of tension-elongation determination) determined during the performance of at least one preceding wrapping operation and specific to the wrapping material. The control unit may be configured to automatically control the tensioning device depending on the comparison (e.g., depending on a deviation determined by the comparison of the actual value and the target value).

With regard to the design options and the advantages of the round baler and the system, reference is made to the discussion of the disclosed method above.

Referring to the figures, a round baler 1 for producing round bales may be towed by a towing vehicle, such as a tractor (not shown), and supplied with power via a drive shaft that may be coupled to the tractor to drive the conveying and processing equipment. In harvesting mode, the round baler 1 picks up or collects harvested material lying on the field, for example straw or grass laid in a windrow, and processes it into a compressed round bale, which may then be wrapped with an elastic, web-like wrapping material and ejected from the rear of the round baler 1 after completion.

Figure 1:
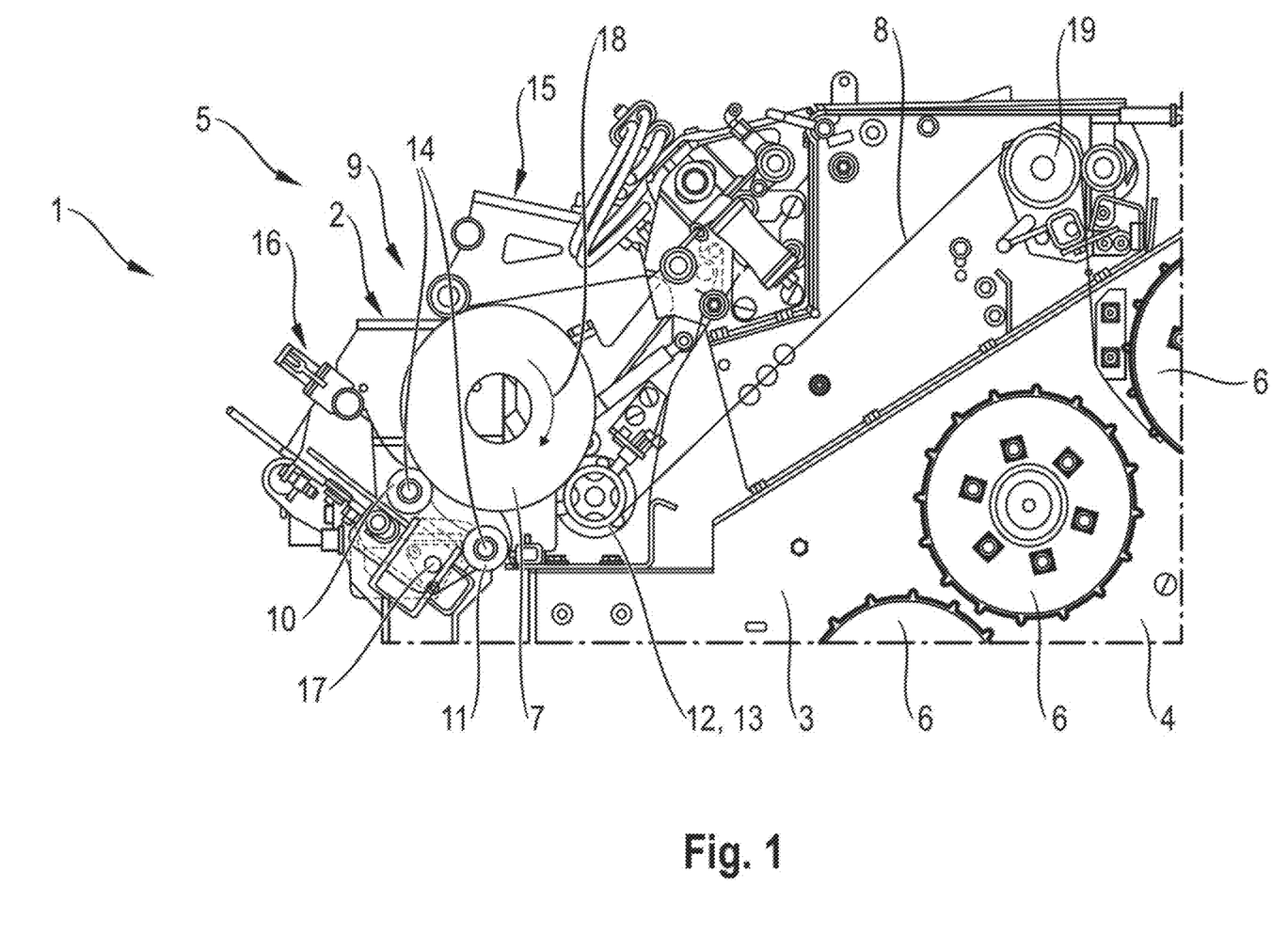
FIG. 1 illustrates a schematic cross-sectional view through a feed device of a round baler.

Various balers are contemplated, such as in FIG. 1, which illustrates a schematic cross-sectional view through a feed device 5 of the round baler 1. An example round baler is disclosed in US Patent Application Publication No. 2019/0090430 A1, incorporated by reference herein in its entirety. The round baler 1 comprises a housing 2, which may delimit an interior space 3. Within this interior space 3 is a bale chamber 4, which may be bounded by a plurality of profiled rollers 6. Within the bale chamber 4, harvested material picked up or collected by the baler 1 may be pressed into a round bale. In one or some embodiments, the bale chamber 4 is designed with a fixed cross-section. The illustrated round baler 1 may therefore be a so-called fixed chamber baler. Though, the present invention is not limited to such round balers, and may also include those whose baling chamber has a variable cross section.

On an upper side of the housing 2, the round baler 1 is provided with the feed device 5. Using the feed device 5, web-like wrapping material 8 held on a supply roller 7 may be fed to the bale chamber 4. The wrapping material 8 may comprise an elastic, web-like film material. A net material may also be used as the wrapping material. In this regard, various types of wrapping material are contemplated. The web-like wrapping material 8 may be used to wrap or enclose a finished round bale. For this purpose, the feed device 5 has a roller holder 9, through which the particular supply roller 7 is mounted. In the illustrated example, the roller holder 9 has a total of three support rollers 10, 11, 12, wherein one of the support rollers 10, 11, 12 may be designed in the form of a tensioning device 13. So that the wrapping material 8 is wound tightly when the round bale is wrapped, the wrapping material 8 may be held under tension using the tensioning device 13. In one or some embodiments, the tensioning device 13 is designed as a braking device with a hydraulically or electromechanically operated drive device. The two other support rollers 10, 11 may each be mounted so as to rotate freely about their particular axis of rotation 14 so that the supply roller 7 may rotate freely about its longitudinal axis within the roller holder 9.

In order to fix the supply roller 7 in its upward position of use, the feed device 5 may further comprise a hold-down device 15, which may cooperate with an associated hold-down roller in an upper region of the supply roller 7. Furthermore, the feed device 5 may cooperate with a pivoting device 16 through which the freely rotating support rollers 10, 11 may be pivoted. For this purpose, the pivoting device 16 may be arranged or positioned to pivot about a pivot axis 17 relative to the rest of the feed device 5. This pivot axis 17 may be oriented parallel to the axes of rotation 14 of the support rollers 10, 11 so that a pivoting of the pivoting device 16 may lead to a translatory movement of the support rollers 10, 11 on a circular path around the pivot axis 17.

Starting from the roller holder 9, the wrapping material 8 may be unwound from the supply roller 7 during operation of the feed device 5, wherein the supply roller 7 may rotate in a direction of rotation 18 about its longitudinal axis. A feed roller 19 of the feed device 5, which may be driven in rotation, is responsible for drawing off or removing the wrapping material 8 from the supply roller 7. A drive unit, such as a hydraulically or electromechanically operated drive unit, may be provided for driving the feed roller 19. Using the feed roller 19, the wrapping material 8 is removed from the supply roller 7 in the conveying direction FR. The tensioning device 13 may hold the wrapping material 8 drawn off or removed by the feed roller 19 under an adjustable tension.

Figure 2:
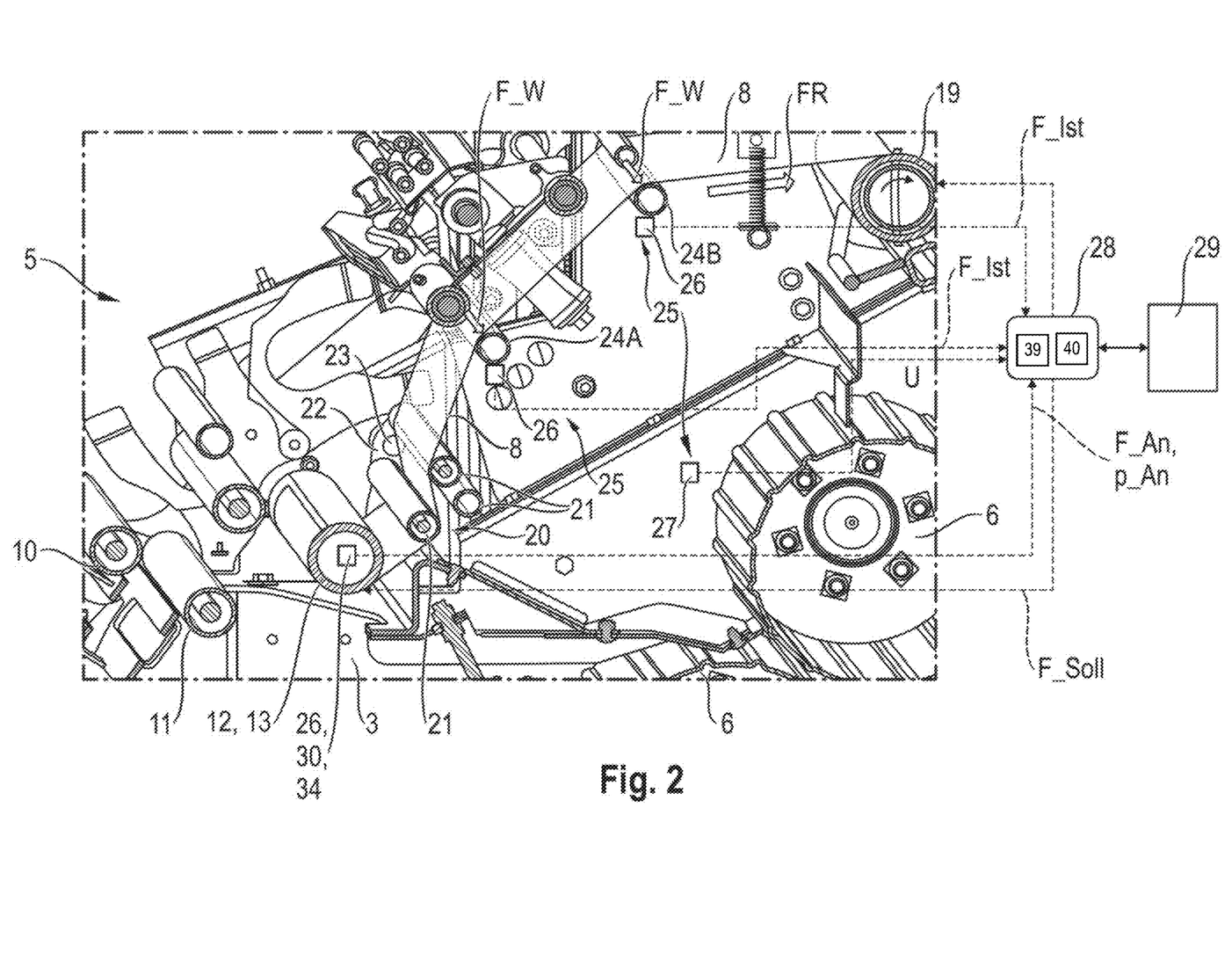
FIG. 2 illustrates a schematic partial view of the feed device according to FIG. 1.

FIG. 2 schematically illustrates a simplified partial view of the feed device 5 of the baler 1 according to FIG. 1. The layout shown in FIG. 2 differs in terms of the changed guidance of the wrapping material 8 in the inner space 3 (alternatively termed inner chamber). A deflection roller assembly 20 may be arranged or positioned downstream from the tensioning device 13. The deflection roller assembly 20 may comprise three deflection rollers 21, each of which is rotatably mounted on a holding device 22. Other numbers of deflection rollers 21 are contemplated. The holding device 22 may be mounted to rotate about a rotational axis 23. The three deflection rollers 21 may be arranged or positioned coaxially to the rotational axis 23 of the holding device 22. The holding device 22 may be arranged or positioned so that it may move relative to the housing 2.

In one or some embodiments, the wrapping material 8 coming from the tensioning device 13 may be guided around two of the deflection rollers 21 in a meandering manner sectionally. Subsequently, the wrapping material 8 may be guided over guide rollers 24A, 24B before the wrapping material 8 reaches the feed roller 19. In one or some embodiments, the tensioning device 13 may exert a force in the opposite direction to the conveying direction FR of the wrapping material 8 in order to place the wrapping material 8 on the circumferential surface of the round bale with an adjustable, in particular material-specific, wrapping tension. Due to the wrapping tension applied by the tensioning device 13, the wrapping material 8 may experience an elongation. The guide rollers 24A, 24B may be spaced apart from one another and may be arranged or positioned at different heights. The guide roller 24A, which may be immediately downstream from the deflection roller assembly 20, as seen in the conveying direction FR, may be arranged or positioned lower than the downstream guide roller 24B. The wrapping material 8 may be deflected sectionally by the guide rollers 24A, 24B in their circumferential direction. The wrapping material 8 tensioned by the tensioning device 13 with the wrapping tension may exert a resulting force F_W on the particular guide roller 24A, 24B. Individual guide rollers 24A, 24B are shown merely as examples. Groups with several guide rollers 24A, 24B may also be provided or used.

In one or some embodiments, the baler 1 comprises a sensor assembly 25 comprising at least one sensor 26. In one or some embodiments, the at least one sensor 26 is designed as a force sensor. The at least one sensor 26 may be assigned to the area of at least one of the two guide rollers 24A, 24B. The illustration shows an example of the assignment of the at least one sensor 26 to the guide roller 24A or 24B. However, it is also contemplated that the at least one sensor 26 is assigned to each of the two guide rollers 24A, 24B.

Furthermore, the round baler 1 may be designed with at least one ambient sensor 27 (alternatively termed an environmental sensor), which may be configured to detect changes in at least one ambient parameter U, such as air humidity and/or ambient temperature. In particular, at least one ambient sensor 27 may be arranged or positioned in the housing 2 of the round baler 1.

The at least one sensor 26 and the at least one ambient sensor 27 may be in communication with a control unit 28 (e.g., signals transmitted wired and/or wirelessly from the at least one sensor 26 and the at least one ambient sensor 27 and optionally vice-versa). Furthermore, the control unit 28 may communicate with any one, any combination, or all of the tensioning device 13, the feed roller 19, or its drive device or drive unit in order to control them (e.g., the control unit 28 may transmit one or more commands to the tensioning device 13, the feed roller 19, or its drive device or drive unit in order to control operation of the tensioning device 13, the feed roller 19, or its drive device or drive unit). In one or some embodiments, the control unit 28 may be connected to or designed with a user interface 29. The user interface 29 may enable an operator of the round baler 1 to have information about the operating state displayed and/or to provide input in the form of entries. For example, the user interface may comprise a touchscreen through which the operator may view output and may provide input.

The control unit 28 comprises a computing unit 39 and a memory unit 40. The computing unit 39 may include at least one processor, with the processor configured to execute the software stored in the memory unit 40 (or in another memory device), which may comprise a non-transitory computer-readable medium that stores data and/or diagrams and/or instructions that when executed by processor performs any one, any combination, or all of the functions described herein. In this regard, material-specific tension-elongation diagrams for different wrapping materials 8 may be stored in the memory unit 40 so that the material-specific tension-elongation diagrams may be accessed by the computing unit 39. Further, the various routines described herein may comprise software routines, which may be executed by computing unit 39. Thus, the computing unit 39 may comprise any type of computing functionality, such as the at least one processor (which may comprise a microprocessor, controller, PLA, or the like) and a memory (such as memory unit 40 or a separate memory). The memory unit 40 may comprise any type of storage device (e.g., any type of memory). As shown in FIG. 2, computing unit 39 and memory unit 40 are depicted as separate elements. Alternatively, computing unit 39 and memory unit 40 may be part of a single machine, which includes a microprocessor (or other type of controller) and a memory. Alternatively, computing unit 39 may rely on memory unit 40 for all of its memory needs.

The computing unit 39 is merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

In one or some embodiments, the control unit 28 is configured to preset a wrapping tension for the tensioning device 13 and to regulate this tension during operation. Efficient operation when wrapping a round bale may be achieved when a large elongation of the wrapping material 8 is achieved by the preset wrapping tension without tearing. The elongation behavior of the wrapping material 8 may be material-specific and may also be influenced by the prevailing ambient conditions, such as ambient temperature and/or humidity as the ambient parameter U. For example, as the ambient temperature increases, the wrapping tension to be applied to the wrapping material 8 for a desired elongation may decrease.

In one or some embodiments, the method provides that an actual value $F\_Ist$ for the force $F\_W$ resulting from the wrapping tension is determined by the sensor assembly 25, which may comprise at least one sensor 26. The measurement may be performed along the conveying path between the supply roller 7 and the feed roller 19. The actual value $F\_Ist$ may be compared with a target value $F\_Soll$ for the force $F\_W$ resulting from the wrapping tension, which may be derived from a tension-elongation diagram (or other type of tension-elongation determination) determined during the execution of at least one preceding wrapping operation and specific to the wrapping material 8. Depending on a deviation determined by the comparison of the actual value $F\_Ist$ and the nominal value $F\_Soll$, the control unit 28 may control the tensioning device 13 (e.g., send one or more commands in order to control the tensioning device 13).

The tension-elongation diagram specific to the wrapping material 8 may be adjusted depending on changing ambient conditions during the execution of a work order comprising several winding operations. In this case, the target value $F\_Soll$ may be adjusted depending on the adaptation of the tension-elongation diagram to changing environmental conditions. In this regard, an adjusted target value $F\_Soll$ may in turn result in a modified operation of the tensioning device 13.

When starting up the round baler 1 at the beginning of a work order on a field, it may be advantageous if an initial wrapping process is performed. During the execution of the initial wrapping process, a successive increase of the wrapping tension applied by the tensioning device 13 may be performed. In so doing, the actual force curve resulting from the change in the wrapping tension of the wrapping material 8 may be determined, such as cyclically determined, and recorded or stored by the control unit 28, which may be used to determine an initial tension-elongation diagram valid for currently prevailing environmental conditions. The target value $F\_Soll$ to be set by the control unit 28 may be derived from this initial tension-elongation diagram. Thus, the one or more current prevailing ambient conditions may be determined. Further, an initial wrapping process may be performed during which a successive increase in the wrapping tension is applied by the tensioning device. Thereafter, an actual force curve resulting from the successive increase in the wrapping tension of the wrapping material may be determined and correlated to the one or more current prevailing ambient conditions. Thereafter, the control unit may determine whether subsequent prevailing ambient conditions match the one or more current prevailing ambient conditions. If so, the control unit may use the actual force curve as an initial tension-elongation behavior.

Over the course of a workday, the environmental conditions may change in such a way that an adaptation of the tension-elongation diagram to changing environmental conditions, for example a higher ambient temperature, may become necessary or warranted. In order to detect such a situation, depending on a change of an environmental parameter U detected by the at least one ambient sensor 27, a check of the need to adapt the tension-elongation diagram and/or the to update the target value F_Soll may be performed. For this purpose, the process steps may be repeated, which may be performed during the execution of the initial wrapping process.

In order to assess whether there is a need to adjust the tension-elongation diagram and/or to update the target value F_Soll, one or more threshold values may be set for the environmental parameters U of the relative humidity and ambient temperature (e.g., different threshold values for the relative humidity and the ambient temperature). The control unit 28 identifying the passing of at least one of the threshold values may trigger the control unit 28 to initiate an automatic execution of checking the need to adjust the tension-elongation diagram and/or the updating of the target value F_Soll. However, it is also contemplated that when at least one of the threshold values is passed, only a message is output to the operator of the round baler 1, with the message indicating to the operator that it is warranted to check the need to adjust the tension-elongation diagram and/or update the target value F_Soll. Accordingly, responsive to the message on the user interface 29, the operator may manually initiate the process (e.g., by entering a command on the touchscreen) for adjusting the tension-elongation diagram and/or updating the target value F_Soll.

Alternatively or additionally, the sensor assembly 25 may comprise at least one force sensor 30, which is configured to determine the drive force F_An to be provided by the drive device with which the tensioning device 13 is operated. The required drive force F_An may also be used to infer the currently set wrapping tension. The control unit 28 may therefore alternatively use the drive force F_An instead of the actual value F_Ist, or the drive force F_An in addition to the latter in order to monitor compliance with the wrapping tension or the set target value F_Soll and to control the drive device of the tensioning device 13.

According to another alternative, when a hydraulically actuated braking device is the tensioning device 13, a required hydraulic pressure p_An may be measured by a pressure sensor 34 with which is applied to the hydraulically operated drive device of the hydraulically actuated braking device in order to apply the wrapping tension to the wrapping material 8. The hydraulic pressure p_An required for this purpose may also be used to infer the currently set wrapping tension. The control unit 28 may therefore alternatively or additionally use the hydraulic pressure p_An instead of (or in addition to) the actual value F_Ist to monitor compliance with the wrapping tension or the set target value F_Soll and to control the drive device of the tensioning device 13.

Figure 3:
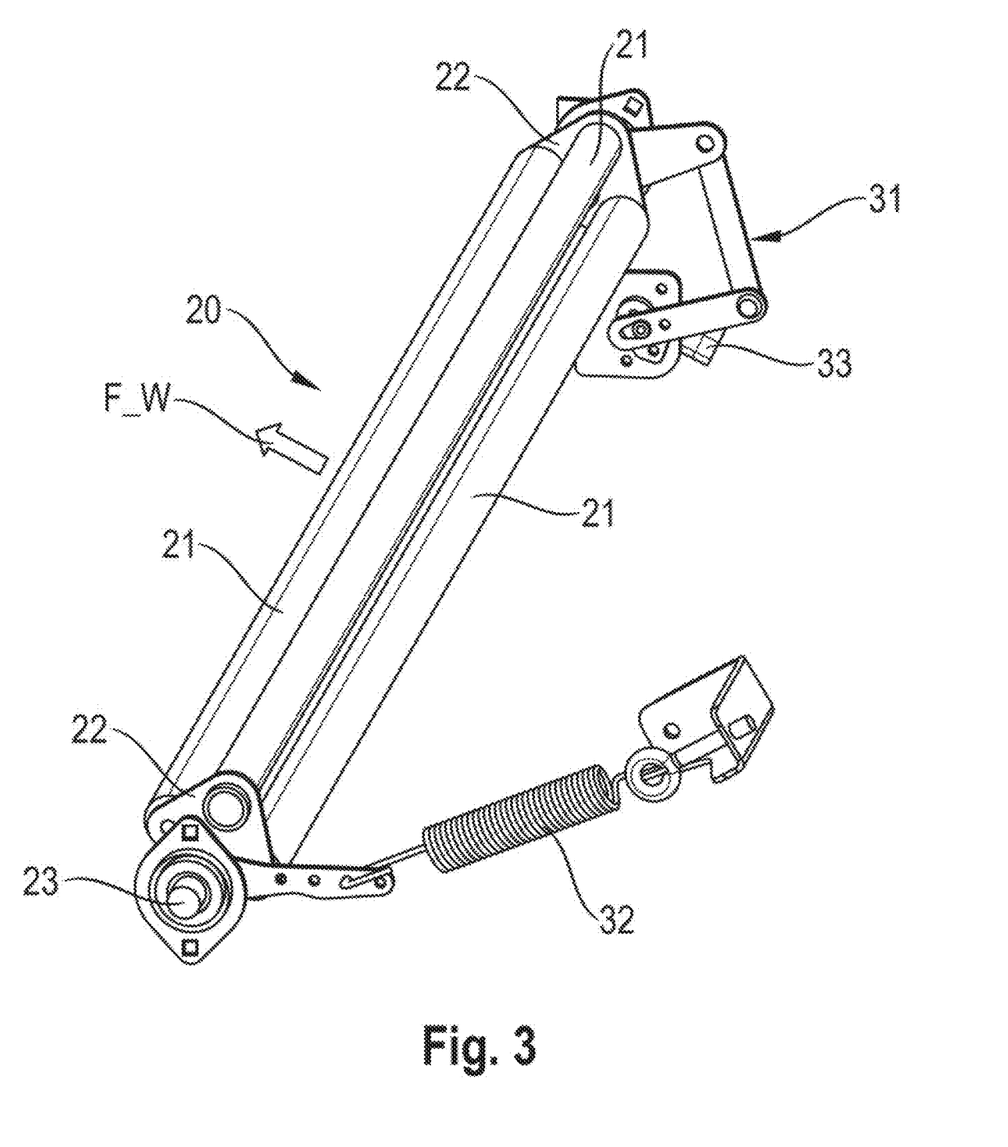
FIG. 3 illustrates a schematic detailed view of a deflection roller assembly.
Figure 4:
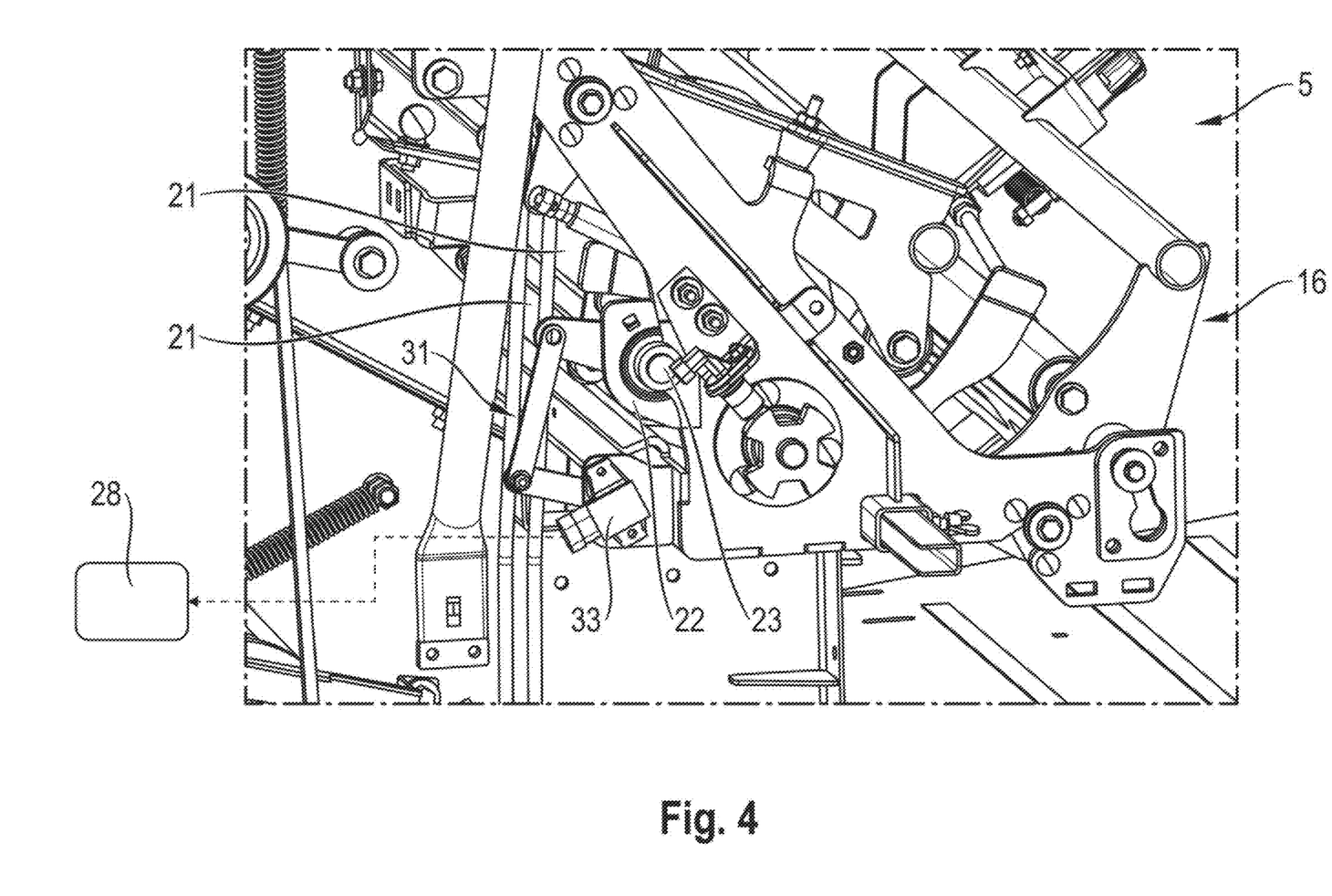
FIG. 4 illustrates a schematic partial view of the feed device.

FIG. 3 illustrates a schematic detailed view of a deflection roller assembly 20. FIG. 4 illustrates a schematic partial view of the deflection roller assembly 20 of the feed device 5. The deflection roller assembly 20 may be loaded or pretensioned by a spring force, here generated using a tension spring 32, as a counterforce when the wrapping material 8 is pulled off or removed from the supply roller 7 and deflected around the deflection rollers 21. In so doing, one end of the tension spring 32 is connected to the rotational axis 23 at one end thereof, and the other end of the tension spring 32 is connected to the housing 2. At the end of the rotational axis 23 opposite the tension spring 32, there may be a lever assembly 31, which may experience a deflection of the rotational axis 23 due to the wrapping tension and transmits it to a sensor 33, such as a potentiometer. The actual value F_Ist for the force F_W exerted on the deflection rollers 21 may be determined from the deflection of the rotational axis 23 (as sensed by at least one sensor) caused by the wrapping tension of the wrapping material 8. To evaluate the signals provided by the sensor 33, the latter may transmit signals (including generated sensor data) to the control unit 28.

Figure 5:
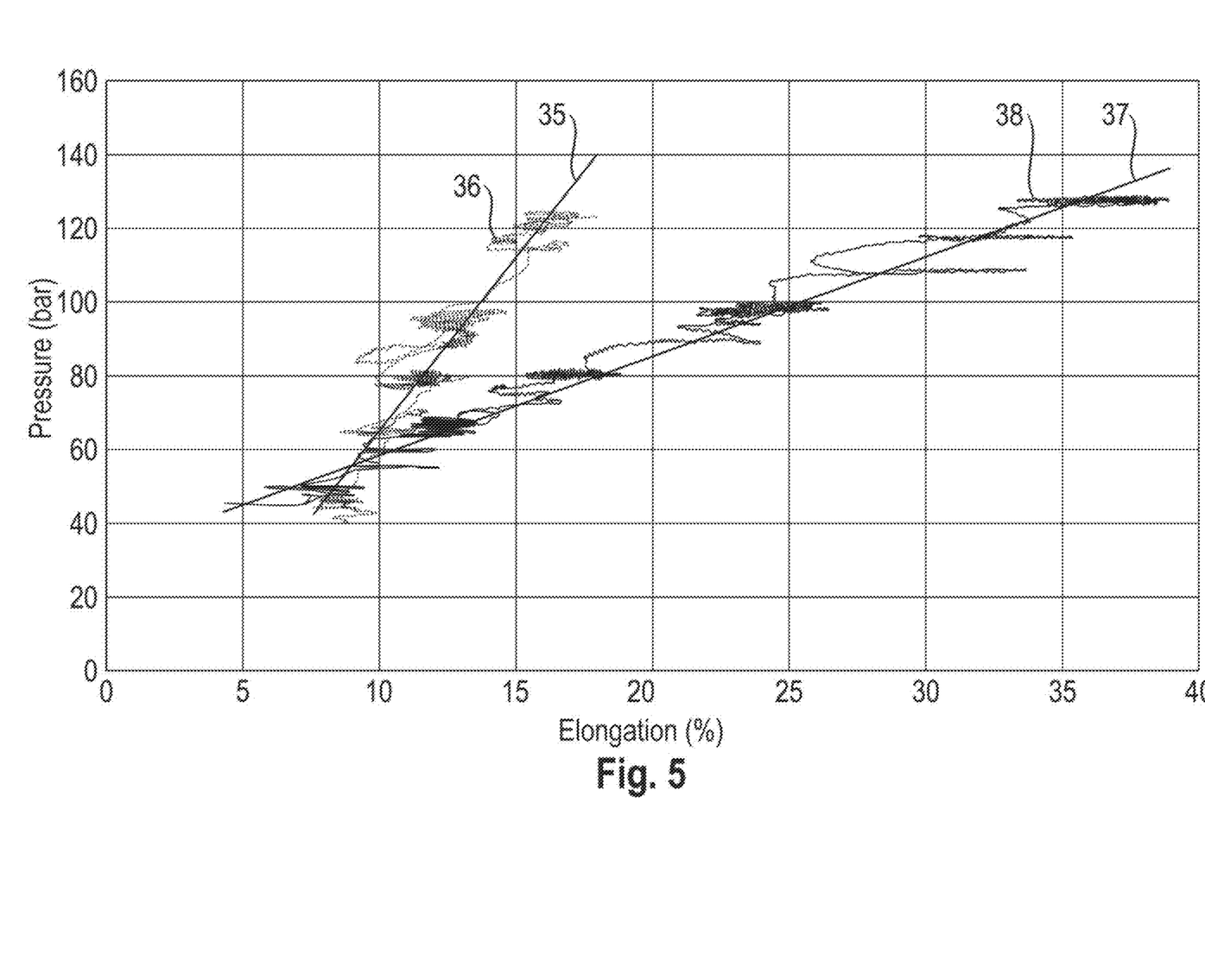
FIG. 5 illustrates an example of a compression-elongation diagram.

FIG. 5 illustrates an example of a pressure-elongation diagram, which shows two curves for two different wrapping materials. Reference sign 35 indicates a calculated linear curve for the first wrapping material, and reference sign 36 indicates an actual curve for the first wrapping material which may be influenced by the ambient parameters U. Reference sign 37 indicates a calculated linear curve for the second wrapping material, and 38 indicates an actually arising curve for the second wrapping material. The determination of the curves 35 and 37 may be based in each case on the pressure measurement by the pressure sensor 34, which may detect the hydraulic pressure applied to the tensioning device 13, which may be designed as a hydraulically-actuated braking device, in order to generate the wrapping tension.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Round bale press
2 Housing
3 Interior space
4 Baling chamber
5 Feed device
6 Profiled rollers
7 Supply roller
8 Wrapping material
9 Roller holder
10 Support roller
11 Support roller
12 Support roller
13 Tensioning device
14 Rotational axis
15 Hold-down device
16 Pivoting device
17 Pivot axis
18 Rotation direction
19 Feed roller
20 Deflection roller assembly
21 Deflection roller 22 Holding device
23 Rotational axis
24A Guide roller
24B Guide roller
25 Sensor assembly
26 Sensor
27 Ambient sensor
28 Control unit
29 User interface
30 Force sensor
31 Lever assembly
32 Tension spring
33 Sensor
34 Pressure sensor
35 Calculated curve
36 Curve
37 Calculated curve
38 Curve
39 Computing unit
Memory unit
F_An Drive force
F_Ist Actual value
F_Soll Target value
F_W Resulting force
FR Conveyance direction
P_An Hydraulic pressure
U Ambient parameter

The invention claimed is:

1. A method for controlling a wrapping process of a round bale rotating in a bale chamber of a round baler performing a work process with an elastic wrapping material which is removed from at least one supply roller using a tensioning device controlled by a control unit and is guided during the wrapping process by at least one guide roller, the method comprising:
   determining, using at least one sensor, an actual value for a force resulting from wrapping tension, wherein the round bale is wrapped with respective wrapping material on the round baler performing the work process pretensioned by a tensioning device with the wrapping tension that is adjustable by a control unit;
   comparing the actual value with a target value for the force resulting from the wrapping tension that is derived from a tension-elongation determination that was determined based on at least one preceding wrapping process of the respective wrapping material used on the round baler performing the work process and specific to the respective wrapping material; and
   controlling, using the control unit, the tensioning device depending on a deviation determined by the comparison of the actual value and the target value.

2. The method of claim 1, wherein the round baler is operating in one or more ambient conditions when executing a work order; and
   further comprising:
      determining at least one change in the one or more ambient conditions when executing the work order; and
      responsive to determining the at least one change in the one or more ambient conditions, adapting the tension-elongation determination specific to the respective wrapping material depending on the at least one change determined in the one or more ambient conditions when executing the work order.

3. The method of claim 2, wherein the round baler performs a first winding operation for generating a first round bale and a second winding operation for generating a second round bale when executing the work order;
   wherein the control unit determines the at least one change in the one or more ambient conditions after performing the first winding operation and prior to performing the second winding operation; and
   wherein, responsive to determining the at least one change in the one or more ambient conditions, the control unit adapts the tension-elongation determination so that the tension-elongation determination is different for the second winding operation than for the first winding operation.

4. The method of claim 2, wherein the target value is adjusted depending on the adaptation of the tension-elongation determination to the at least one change in the ambient conditions.

5. The method of claim 1, further comprising:
   determining one or more current prevailing ambient conditions;
   performing an initial wrapping process during which a successive increase in the wrapping tension applied by the tensioning device is performed;
   determining an actual force curve resulting from the successive increase in the wrapping tension of the respective wrapping material correlated to the one or more current prevailing ambient conditions;
   determining whether subsequent prevailing ambient conditions match the one or more current prevailing ambient conditions; and
   responsive to determining that the subsequent prevailing ambient conditions match the one or more current prevailing ambient conditions, using the actual force curve as an initial tension-elongation behavior.

6. The method of claim 1, wherein the at least one sensor of a sensor assembly comprises at least one of:
   a force sensor that is assigned to a region of the at least one guide roller with which the actual value for the force resulting from the wrapping tension is measured;
   a force sensor that generates data indicative of a drive force to be provided by a drive device with which the tensioning device is operated; or
   a pressure sensor with which a hydraulic pressure is determined which acts on the tensioning device.

7. The method of claim 1, wherein the round baler is operating in one or more ambient conditions when executing a work order; and
   further comprising:
      determining a change in at least one of the one or more ambient conditions;
      determining, based on the change in the at least one of the one or more ambient conditions, whether there is a need to perform one or both of adjusting the tension-elongation determination or updating the target value; and
      responsive to determining there is the need to perform the one or both of adjusting the tension-elongation determination or updating the target value, performing the one or both of adjusting the tension-elongation determination or updating the target value.

8. The method of claim 7, wherein the one or more ambient conditions comprise one or both of air humidity or ambient temperature; and
   wherein the tension-elongation determination comprises a tension-elongation diagram.

9. The method of claim 1, wherein the round baler is performing the work process on a field;

wherein the tension-elongation determination was determined based on at least one preceding wrapping process during the work process earlier performed on the field; and wherein determining the actual value for the force resulting from wrapping tension is performed during a same work process.

10. The method of claim 1, wherein the target value is determined based on the round baler performing at least one preceding wrapping process of the work process.

11. A round baler comprising:
a bale chamber in which a rotating bale is wrapped with respective wrapping material;
a tensioning device configured to remove from at least one supply roller the respective wrapping material during a wrapping process;
at least one guide roller configured to guide the removed wrapping material during the wrapping process;
a sensor assembly comprising at least one sensor which is configured to generate sensor data indicative of an actual value for a force resulting from wrapping tension created by the tensioning device wrapping the respective wrapping material during the wrapping process; and
a control unit in communication with the tensioning device and the sensor assembly, the control unit configured to:
compare the actual value with a target value, the target value derived from a tension-elongation determination that was determined based on at least one preceding wrapping process of the respective wrapping material used on the round baler performing a work process and specific to the respective wrapping material; and
control the tensioning device depending on a deviation determined by the comparison of the actual value and the target value.

12. The round baler of claim 11, wherein the at least one sensor of the sensor assembly comprises a force sensor positioned in a region of the at least one guide roller in order to generate the sensor data indicative of the actual value for the force resulting from the wrapping tension.

13. The round baler of claim 11, wherein the tensioning device comprises a braking device with a hydraulically or electromechanically operated drive device; and
wherein the at least one sensor of the sensor assembly comprises:
a force sensor configured to generate the sensor data indicative of a drive force provided by the drive device; or
a pressure sensor configured to generate the sensor data indicative of a hydraulic pressure which is applied to the hydraulically operated drive device in order to determine the actual value for the force resulting from the wrapping tension.

14. The round baler of claim 11, further comprising a deflection roller assembly positioned downstream from the tensioning device and comprising a plurality of deflection rollers which are rotatably mounted on a spring-loaded holding device;
wherein the spring-loaded holding device is loaded by a spring force as a counterforce when the respective wrapping material is removed; and
wherein a sensor designed as a potentiometer is configured to detect deflection of the spring-loaded holding device based on the force resulting from the wrapping tension.

15. The round baler of claim 11, further comprising at least one ambient sensor configured to determine one or both of air humidity or ambient temperature; and
wherein the control unit is configured to control the tensioning device based at least in part on the determined one or both of the air humidity or the ambient temperature.

16. The round baler of claim 15, wherein the control unit is configured to:
evaluate sensor data generated by the at least one ambient sensor; and
depending on the evaluation, perform one or both of:
proposing to an operator of the round baler one or both of adapting the tension-elongation determination or updating of the target value; or
automatically performing the one or both of the adapting the tension-elongation determination or the updating of the target value.

17. The round baler of claim 16, wherein one or more ambient conditions comprise one or both of the air humidity or the ambient temperature; and
wherein the control unit is configured to evaluate sensor data generated by the at least one ambient sensor by:
determining a change in at least one of the one or more ambient conditions;
determining, based on the change in the at least one of the one or more ambient conditions, whether there is a need to perform the one or both of the adapting the tension-elongation determination or the updating of the target value; and
responsive to determining there is the need to perform the one or both of the adapting the tension-elongation determination or the updating of the target value, automatically performing the one or both of the adapting the tension-elongation determination or the updating of the target value.

18. The round baler of claim 17, wherein the one or more ambient conditions comprise both the air humidity and the ambient temperature;
wherein the control unit is configured to determine the change in both the air humidity and the ambient temperature; and
wherein the tension-elongation determination comprises a tension-elongation diagram.

19. A system for controlling a wrapping process of a round bale rotating in a bale chamber of a round baler with an elastic, web-like wrapping material which is drawn off from at least one supply roller and guided during the wrapping process in order to wrap the round bale with pretensioned respective wrapping material, the system comprising:
a tensioning device configured to remove the respective wrapping material from the at least one supply roller;
at least one guide roller configured to guide the removed wrapping material during the wrapping process;
a sensor assembly comprising at least one sensor which is configured to generate sensor data indicative of an actual value for a force resulting from wrapping tension created by the tensioning device wrapping the respective wrapping material during the wrapping process; and
a control unit in communication with the tensioning device and the sensor assembly, the control unit configured to:
compare the actual value with a target value, the target value derived from a tension-elongation determination that was determined based on at least one preceding wrapping process of the respective wrapping material used on the round baler performing a work process and specific to the respective wrapping material; and control the tensioning device depending on a deviation determined by the comparison of the actual value and the target value.

20. The system of claim 19, further comprising at least one ambient sensor configured to detect one or both of air humidity or ambient temperature; and wherein the control unit is configured to control the tensioning device based at least in part on the detected one or both of the air humidity or the ambient temperature.

* * * * *